US010708526B2

(12) United States Patent
Richards (10) Patent No.: US 10,708,526 B2
(45) Date of Patent: Jul. 7, 2020

(54) METHOD AND APPARATUS FOR DETERMINING LENS SHADING CORRECTION FOR A MULTIPLE CAMERA DEVICE WITH VARIOUS FIELDS OF VIEW

(71) Applicant: Motorola Mobility LLC, Chicago, IL (US)

(72) Inventor: By-Her W Richards, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 18 days.

(21) Appl. No.: 14/693,103

(22) Filed: Apr. 22, 2015

(65) Prior Publication Data

US 2016/0316155 A1    Oct. 27, 2016

(51) Int. Cl.
| | |
|---|---|
| *H04N 5/357* | (2011.01) |
| *G06T 5/00* | (2006.01) |
| *H04N 5/217* | (2011.01) |
| *G06T 5/50* | (2006.01) |
| *H04N 5/225* | (2006.01) |
| *H04N 5/247* | (2006.01) |
| *H04N 5/232* | (2006.01) |
| *H04N 5/235* | (2006.01) |

(52) U.S. Cl.
CPC .......... *H04N 5/3572* (2013.01); *G06T 5/008* (2013.01); *G06T 5/50* (2013.01); *H04N 5/217* (2013.01); *H04N 5/2258* (2013.01); *H04N 5/23229* (2013.01); *H04N 5/247* (2013.01)

(58) Field of Classification Search
CPC .... H04N 5/3572; H04N 5/217; H04N 5/2258; H04N 5/247; H04N 5/23229; H04N 5/2176; H04N 5/235; G06T 5/008; G06T 5/50; G06T 5/006; G06T 5/002
See application file for complete search history.

(56) References Cited

U.S. PATENT DOCUMENTS

| | | | |
|---|---|---|---|
| 8,553,106 B2 | 10/2013 | Scarff | |
| 2004/0041919 A1* | 3/2004 | Yamanaka | H04N 5/217 348/222.1 |

(Continued)

OTHER PUBLICATIONS

By-Her W. Richards, et al., "Multiple Camera Apparatus and Method for Synchronized Autofocus", U.S. Appl. No. 14/549,735, filed Nov. 21, 2014.

(Continued)

*Primary Examiner* — Albert H Cutler
(74) *Attorney, Agent, or Firm* — Loppnow & Chapa; Matthew C. Loppnow (57) ABSTRACT

A method and apparatus can determine lens shading correction for a multiple camera device with various fields of view. According to a possible embodiment, a flat-field image can be captured using a first camera having a first lens for a multiple camera device. A first lens shading correction ratio can be ascertained for the first camera. A second lens shading correction ratio can be determined for a second camera having a second lens for the multiple camera device. The second camera can have a different field of view from the first camera. The second lens shading correction ratio can be based on the first lens shading correction ratio and can be based on the flat-field image acquired by the first camera.

18 Claims, 8 Drawing Sheets

(56) References Cited

U.S. PATENT DOCUMENTS

| | | | |
|---|---|---|---|
| 2008/0030592 A1 | 2/2008 | Border et al. | |
| 2008/0099678 A1* | 5/2008 | Johnson | G01J 5/02 |
| | | | 250/332 |
| 2009/0322892 A1 | 12/2009 | Smith | |
| 2010/0238327 A1 | 9/2010 | Griffith et al. | |
| 2011/0102548 A1* | 5/2011 | Kim | H04N 13/0221 |
| | | | 348/46 |
| 2014/0036112 A1 | 2/2014 | Scarff | |
| 2014/0210950 A1* | 7/2014 | Atanassov | G06T 7/62 |
| | | | 348/47 |
| 2015/0030258 A1* | 1/2015 | Chen | G06T 5/002 |
| | | | 382/266 |
| 2015/0365576 A1* | 12/2015 | Wang | H04N 5/238 |
| | | | 348/251 |
| 2016/0044252 A1* | 2/2016 | Molina | H04N 5/2258 |
| | | | 348/208.6 |
| 2016/0241791 A1* | 8/2016 | Narayanswamy | G06T 15/00 |

OTHER PUBLICATIONS

By-Her W. Richards, et al., "Multiple Camera Apparatus and Method for Synchronized Auto White Balance", U.S. Appl. No. 14/579,111, filed Dec. 22, 2014.

By-Her W. Richards, et al., "Dual Camera System Zoom Notification", U.S. Appl. No. 14/628,415, filed Feb. 23, 2015.

Combined Search and Examination Report for Application No. GB1605307.6, Great Britain Intellectual Property Office, dated Aug. 18, 2016.

* cited by examiner

METHOD AND APPARATUS FOR DETERMINING LENS SHADING CORRECTION FOR A MULTIPLE CAMERA DEVICE WITH VARIOUS FIELDS OF VIEW

BACKGROUND

1. Field

The present disclosure is directed to a method and apparatus for determining lens shading correction for a multiple camera device with various fields of view.

2. Introduction

Presently, portable devices, such as mobile phones, tablet devices, digital cameras, multimedia devices, and other types of computing and electronic devices often include a digital camera device that is utilized to capture digital images. A digital camera includes a lens and an image sensor. One issue that arises in the operation of image sensors is the need to perform lens shading correction. An image sensor typically has a two-dimensional array of photo-sensitive pixels. The camera lens can be a single lens or a micro-lens array that focuses light onto individual pixels of the image sensor. However, various imperfections in the camera lens create a shading effect. One common shading effect is that that the image is brighter in the center and decreases in brightness at the edges of the pixel array. More generally there will be a two-dimensional variation in shading across the array of pixels caused by the optical elements in the optical assembly and the difficulties in uniformly projecting an image across the field of view of the image sensor. Uncorrected shading effects can result in undesirable variations in intensity across an image that may be discernable to an end user. Lens shading correction algorithms are used to correct for shading in an image sensor. Empirical data is used to determine coefficients of a gain correction function that is used to adjust the gain of individual pixels to compensate for the lens shading.

Some portable devices include multiple digital cameras that face in the same direction. Specifically, every camera in a multiple camera system has a different field of view of the scene from each other. The multiple digital cameras in such a system can generate multiple images with different fields of view of the same scene and the multiple images can be merged into one image. Unfortunately, without a matching algorithm, different lens shading corrections applied to different cameras in a multiple camera device cause imperfections when images from multiple cameras are combined. Thus, there is a need for a method and apparatus for determining lens shading correction for a multiple camera device with various fields of view.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for determining lens shading correction for a multiple camera device with various field of views. A matching algorithm of lens shading corrections can be performed on every two cameras in a multiple camera device at one time. For every two cameras, we can have a first camera and a second camera. According to a possible embodiment, a flat-field image can be captured using the first camera having a first lens for the multiple camera device. A first lens shading correction ratio can be ascertained for the first camera. A second lens shading correction ratio can be determined for the second camera having a second lens for the multiple camera device. The second camera can have a different field of view from the first camera. The second lens shading correction ratio can be based on the first lens shading correction ratio and can be based on the flat-field image acquired from the first camera.

Figure 1:
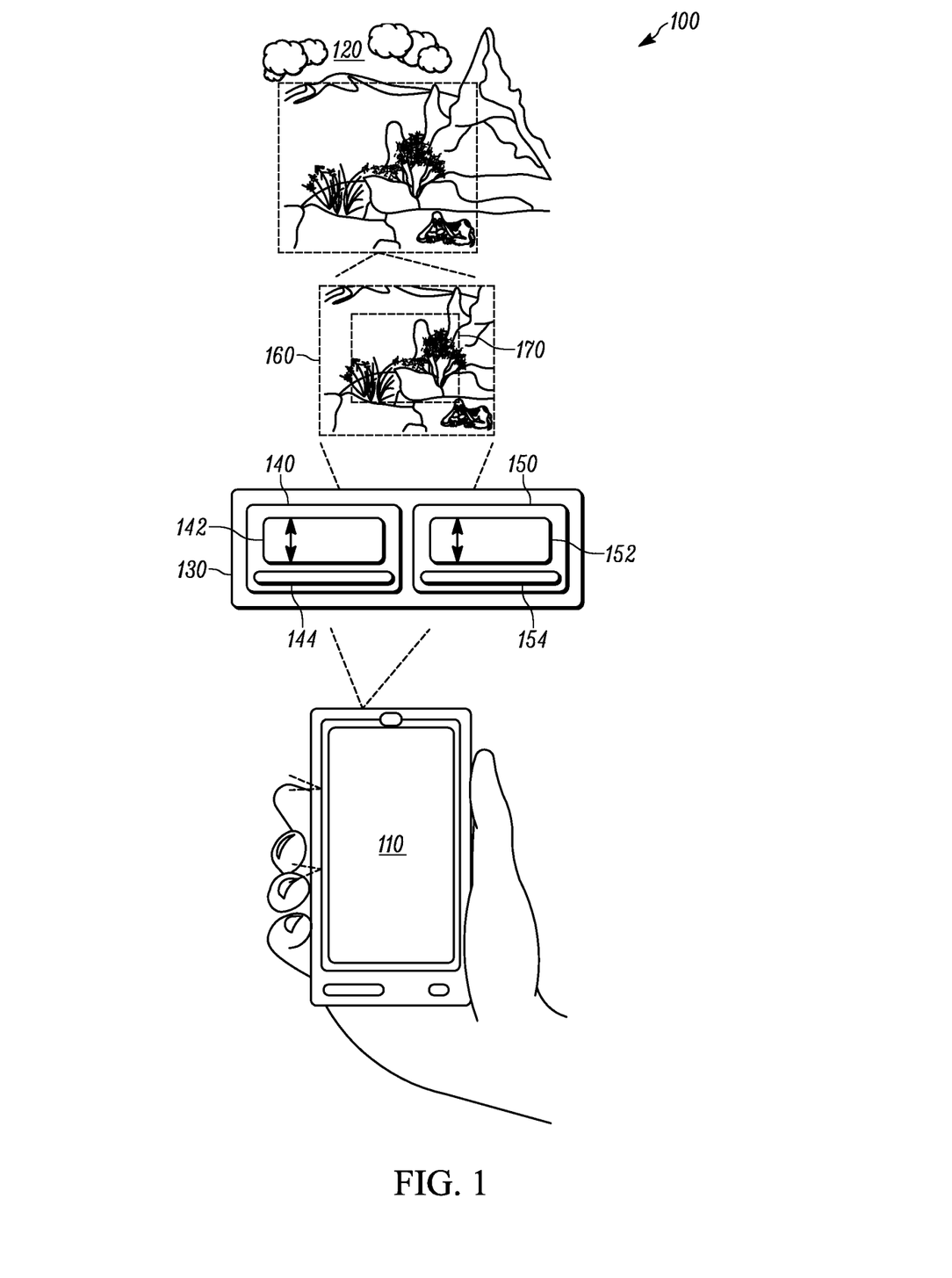
FIG. 1 is an example illustration of a system according to a possible embodiment.

FIG. 1 is an example illustration of a system 100 according to a possible embodiment. The system 100 can include a mobile device 110 and a scene 120. The mobile device 110 can include a multiple camera system 130. The mobile device 110 can be any type of mobile phone, smartphone, tablet device, digital camera, laptop computer, or other type of portable computing and/or electronic device that includes a multiple camera system 130. In this example embodiment, the multiple camera system 130 can include two cameras 140 and 150 that can capture a digital image. The multiple camera system 130 can also include more than two cameras. A first camera 140 can include a first lens 142 and a first image sensor 144. Similarly, a second camera 150 can include a second lens 152 and a second image sensor 154. The second camera 150 can have a different field of view from the first camera 140. For example, the first camera 140 can have a wide field of view and can capture a first image 160 of the scene 120 and the second camera 150 can have a narrower field of view and can capture a second image 170 of the scene 120 at the same time the first camera 130 captures the first image 160. The second image 170 can have a narrower field of view than the first image 160. Alternately, the second image 170 can have a wider field of view than the first image 160. To achieve this, the first lens 142 can have different characteristics, such as a different focal length, from the second lens 152. The lenses 142 and 152 can have different characteristics by being of different physical shapes and dimensions and can also have different characteristics by employing multiple lenses to achieve different fields of view.

For example, the multiple camera system 130 can include a wide angle camera and telephoto camera. The terms "wide angle" and "telephoto" are relative between the cameras and each camera may or may not be considered wide angle or telephoto when compared to cameras on other devices. The wide camera can capture images with a wider field of view than the telephoto camera and the telephoto camera can capture images at a narrower field of view than the wide camera. The apparatus 110 employing the multiple camera system 130 can merge a wide image and a telephoto image per scene to provide a zoomed image, which can be a better image than a digital zoom image, and can be competitive with an optical zoom image, given the same zoom ratio. Lens shading correction can also be applied to the images. For example, without lens shading correction, the image surface of wide image and that of the telephoto image are not matched during the merge process.

An image may consist of multiple channels, such as four channels of RGrGbB or RGBC, on CMOS camera sensors. For each channel per image, the image surface can be from a flat-field image, and a pixel profile can be from a diagonal cross-section of the image surface. With a proper lens shading correction for each image, the image surface of the wide image and that of the telephoto image can be matched per channel during the merge process. When the lens shading correction ratio is high for both images, such as >=80%, the noise can be much higher at the four corners of each image, as compared to the center of each image. During the merge processing per channel, the four corners of the telephoto image can have higher noise at the merged pixel coordinates with the wide image, where the noise of the wide image is lower. This is because lens shading correction amplifies pixel signals with a higher gain at the four corners of both images when it increases the signals at the corners to correct for lens vignetting. At the same time, the noise in the image is also amplified more at the four corners of each image. At low light, noise is higher on the whole image, so noise level at the corners can be much worse after lens shading correction. This can make it difficult to generate a smooth merged image area around the four corners of telephoto image per channel. Embodiments can solve this and other problems by providing a method and apparatus to match lens shading correction on wide and telephoto images per channel, in terms of noise level and pixel profile. For example, embodiments can provide solutions to reduce and match noise levels between wide and telephoto images.

In some implementations, before lens shading correction, a non-radial noise reduction filter can be applied in every channel of the whole image, respectively, for wide and telephoto images. This can reduce noise before it gets amplified. After lens shading correction, a radial noise reduction filter can be applied in every channel of the whole image, respectively for wide and telephoto images. This can reduce noise at the corners more aggressively after the pixel signals get amplified. During the tuning of each noise reduction filter per channel across all light levels the strength for wide and telephoto cameras can be matched to have a similar Signal-to-Noise Ratio (SNR) at the same light level.

Figure 2:
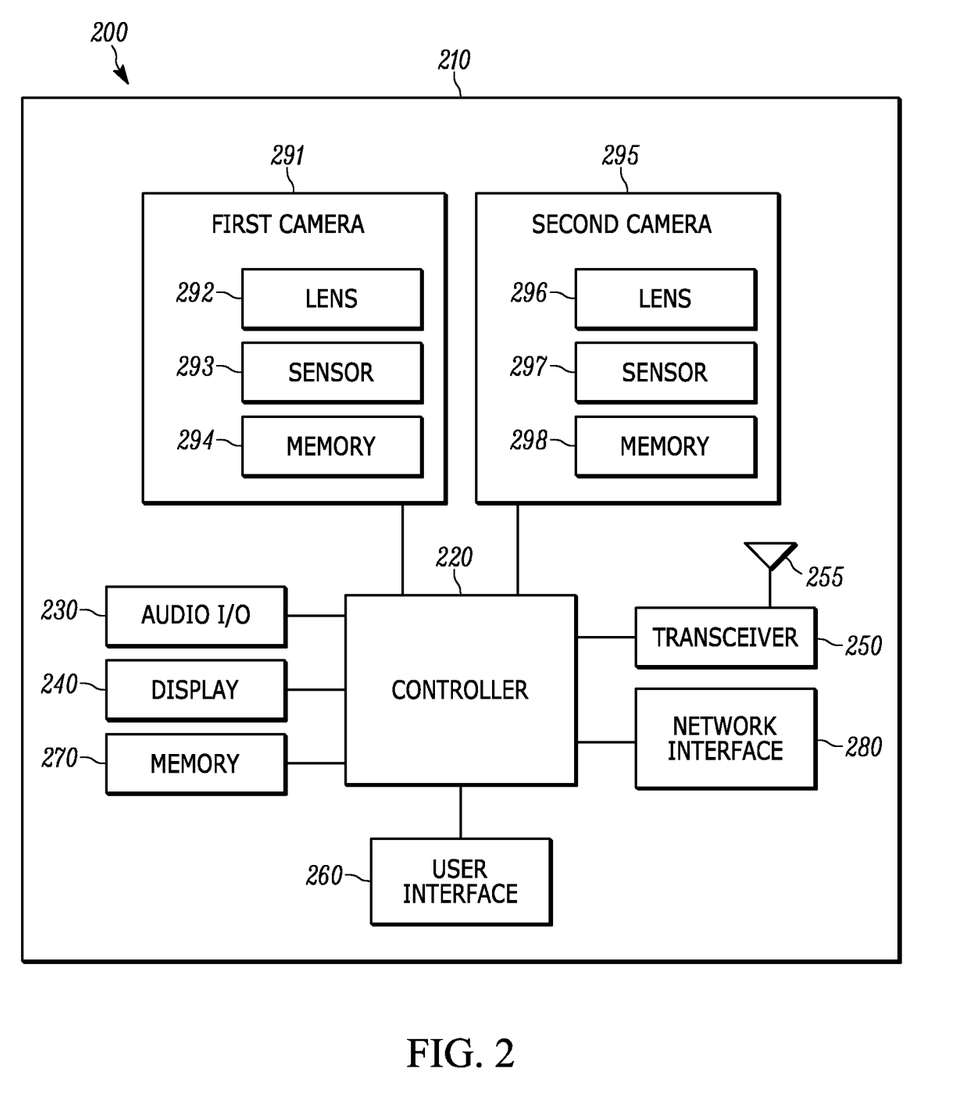
FIG. 2 is an example block diagram of an apparatus, such as a mobile device, according to a possible embodiment

FIG. 2 is an example block diagram of an apparatus 200, such as the mobile device 110, according to a possible embodiment. The apparatus 200 can include a housing 210, a controller 220 within the housing 210, audio input and output circuitry 230 coupled to the controller 220, a display 240 coupled to the controller 220, a transceiver 250 coupled to the controller 220, an antenna 255 coupled to the transceiver 250, a user interface 260 coupled to the controller 220, a memory 270 coupled to the controller 220, and a network interface 280 coupled to the controller 220. The apparatus 200 can also include at least two cameras, such as a first camera 291 and a second camera 295, which can be equivalent to the first camera 140 and the second camera 150, respectively. The apparatus 200 can perform methods described in the embodiments.

The display 240 can be a viewfinder, a liquid crystal display (LCD), a light emitting diode (LED) display, a plasma display, a projection display, a touch screen, or any other device that displays information. The transceiver 250 can include a transmitter and/or a receiver. The audio input and output circuitry 230 can include a microphone, a speaker, a transducer, or any other audio input and output circuitry. The user interface 260 can include a keypad, a keyboard, buttons, a touch pad, a joystick, a touch screen display, another additional display, or any other device useful for providing an interface between a user and an electronic device. The network interface 280 can be a universal serial bus port, an Ethernet port, an infrared transmitter/receiver, a USB port, an IEEE 1392 port, a WLAN transceiver, or any other interface that can connect an apparatus to a network or computer and that can transmit and receive data communication signals. The memory 270 can include a random access memory, a read only memory, an optical memory, a flash memory, a removable memory, a hard drive, a cache, or any other memory that can be coupled to a wireless communication device.

The apparatus 200 or the controller 220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 270 or elsewhere on the apparatus 200. The apparatus 200 or the controller 220 may also use hardware to implement disclosed operations. For example, the controller 220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 220 may be any controller or processor device or devices capable of operating an electronic device and implementing the disclosed embodiments. The network interface 280 can be a wired communication interface, such as a universal serial bus interface, a serial wire interface, a parallel wire interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces.

The first camera 291 can include a first lens 292, a first sensor 293, and first camera memory 294. The second camera 295 can include a second lens 296, a second sensor 297, and second camera memory 298. The second camera 295 can have a different field of view from the first camera 291. In operation, the first camera 192 can capture a first image via the first lens 292 and the first sensor 293. The second camera 295 can capture a second image. Any of the memory 294, 298, and 270 can include a first lens shading correction table based on a first lens shading correction ratio of the first camera 291 and a second lens shading correction table based on a second lens shading correction ratio. The second lens shading correction ratio can be based on the first lens shading correction ratio and based on a flat-field image captured using the first camera. The second lens shading correction ratio can also be based on other elements in the disclosed embodiments. According to a possible embodiment, the first camera memory 294 can include the first lens shading correction table and the second camera memory 298 can include the second lens shading correction table. The controller 220 can provide lens shading correction to the first image based on the first lens shading correction table to generate a corrected first image, provide lens shading correction to the second image based on the second lens shading correction table to generate a corrected second image, and merge the corrected first image with the corrected second image to generate a merged image. The controller 220 can also output the merged image for display on the display 240, for storage in the memory 270, for transmission to another device via the transceiver 250 or the network interface 280, and/or otherwise output the merged image.

Figure 3:
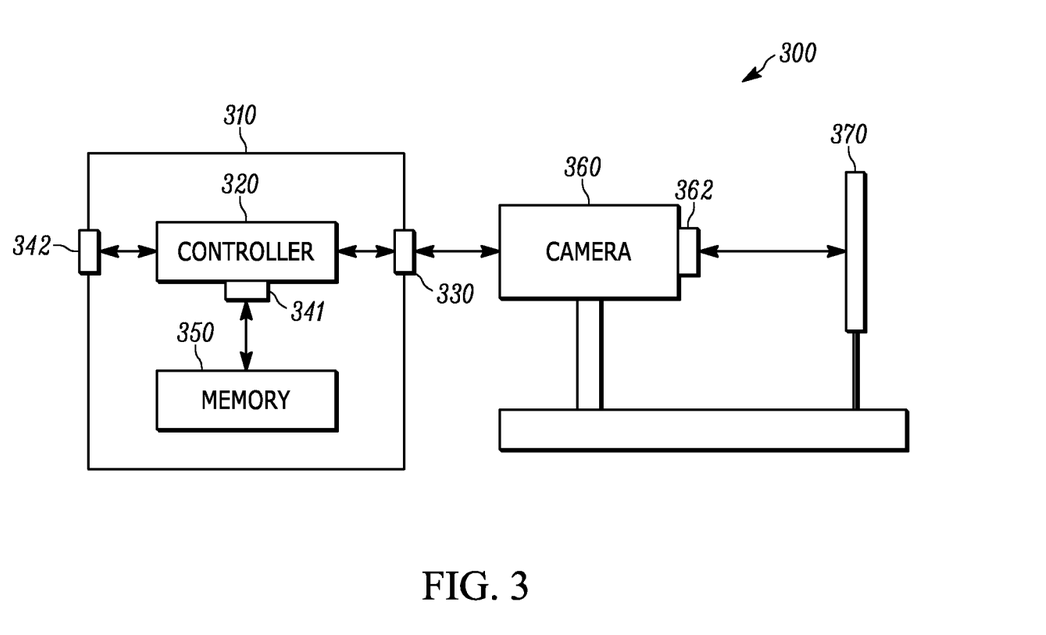
FIG. 3 is an example illustration of a system according to a possible embodiment.

FIG. 3 is an example illustration of a system 300 according to a possible embodiment. The system 300 can include an apparatus 310, such as a camera calibration apparatus, a camera 360, and a test object 370, such as a diffuser plate, a contrast chart, a gray card, a light source, or any other object that can be used for camera calibration. The apparatus 310 can include an input 330, a controller 320, a memory 350, and at least one output 341 and/or 342. The output 341 can output data from the controller 320 to the memory 350 and the output 342 can output data external to the apparatus 310 from the controller 320. The apparatus 310 or the controller 320 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 350 or elsewhere on the apparatus 310. The apparatus 310 or the controller 320 may also use hardware to implement disclosed operations. For example, the controller 320 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an electronic device and implementing the disclosed embodiments.

In operation, the input 330 can receive a flat-field image captured using a first camera 360 having a first lens 362 for a multiple camera device, such as the apparatus 110, the multiple camera system 130, and/or any other multiple camera device. The controller 320 can ascertain a first lens shading correction ratio for the first camera 360. The controller 320 can ascertain the first lens shading correction ratio for the first camera to achieve an optimal trade-off between correction of vignetting of the flat-field image and enhancement of corner noise of the flat-field image. For example, the first lens shading correction ratio can be chosen such that a given color channel achieves a desired lens shading correction per light source or light level of interest after lens shading correction is applied.

The controller 320 can determine a second lens shading correction ratio for a second camera for the multiple camera device. The second camera can have a different field of view from the first camera. Each camera in the multiple camera device can include a lens and an image sensor. The first and second camera lenses can have different focal lengths in that the first camera can use a lens with a first focal length to produce a first image and the second camera can use a lens with a second focal length different from first focal length to produce a second image. For example, the first camera can have a lens with a first field of view and the second camera can have a lens with a narrower second field of view than the first field of view, or vice versa. The focal lengths of the lenses may be different in that the lenses may have different physical characteristics, may include multiple lenses, may have different distances to relative image sensors, may utilize mirrors, or may have different focal lengths based on any other characteristics.

The second lens shading correction ratio can be based on the first lens shading correction ratio and based on the flat-field image acquired by the first camera. The second lens shading correction ratio can be based on the first lens shading correction ratio to match a second image surface of a second corrected flat-field image to a first image surface of a first corrected flat-field image. For example, the second image surface of a second corrected flat-field image using a second lens shading correction table can be matched to a first image surface of the first corrected flat-field image using a first lens shading correction table.

For example, to determine the second lens shading correction ratio, the controller 320 can generate a corrected flat-field image of the first camera based on the first lens shading correction ratio and the flat-field image acquired by the first camera. The controller 320 can determine a fall-off pixel profile ratio of the corrected flat-field image of the first camera at a specific pixel coordinate. The controller 320 can then determine the second lens shading correction ratio for the second camera based on the determined fall-off pixel profile ratio at the specific pixel coordinate. A multiple camera device can also include more than two cameras and the lens correction ratios of each of the multiple cameras can be based on the first lens correction ratio, such as based on the determined fall-off pixel profile ratio at the specific pixel coordinate.

According to a possible embodiment, the controller 320 can determine the fall-off pixel profile ratio by determining a pixel intensity (y) of the fall-off pixel profile at the specific pixel coordinate of the corrected flat-field image of the first camera corresponding to a pixel coordinate of an edge of a second image to be captured by the second camera, where the edge of the second image is within an edge of the flat-field image when an area of the second image is superimposed on the corrected flat-field image of the first camera. The controller 320 can then determine the fall-off pixel profile ratio of the corrected flat-field image of the first camera based on the pixel intensity (y). This embodiment can be used when the first camera has a wider field of view than the second camera and the corners of the second camera's field of view are within the first camera's field of view.

According to a possible implementation of this embodiment, the pixel intensity can be a first pixel intensity. The fall-off pixel profile ratio can be a ratio between the first pixel intensity (y) of the fall-off pixel profile of the corrected flat-field image of the first camera and a second pixel intensity ($I_0$) of the corrected flat-field image of the first camera at a center of the fall-off pixel profile of the corrected flat-field image of the first camera. The controller 320 can then determine the fall-off pixel profile ratio of the corrected flat-field image of the first camera based on the first and second pixel intensities.

According to another possible embodiment, the controller 320 can determine the fall-off pixel profile ratio by determining a pixel intensity (y) at a location along an extension of the fall-off pixel profile of the corrected flat-field image of the first camera at the specific pixel coordinate that corresponds to an edge of a second image to be captured by the second camera. The controller 320 can then determine the fall-off pixel profile ratio of the corrected flat-field image of the first camera based on the pixel intensity (y). This embodiment can be used when the first camera has a narrower field of view than the second camera and the corners of the second camera's field of view are outside of the first camera's field of view.

According to a possible implementation of this embodiment, the pixel intensity (y) can be a first pixel intensity. The fall-off pixel profile ratio can be a ratio between the first pixel intensity (y) of the extension of the fall-off pixel profile of the corrected flat-field image of the first camera, and a second pixel intensity ($I_0$) of the corrected flat-field image of the first camera at a center of the fall-off pixel profile of the corrected flat-field image of the first camera. The controller 320 can then determine the fall-off pixel profile ratio of the corrected flat-field image of the first camera based on the first and second pixel intensities.

The output 341 or 340 can output the second lens shading correction ratio. For example, the output 341 can output the second lens shading correction ratio to local memory, such as RAM, solid state memory, a hard drive, or any other memory local to the apparatus. The output 342 can also output the second lens shading correction ratio to another device, such as memory on a device using the multiple camera device, memory in the multiple camera device, or memory in the second camera. The output 342 can further output the second lens shading correction ratio to a display, over a local network, over a wide area network, or to any other element that receives an output of a second lens shading correction ratio. For example, the controller 320 can generate a first lens shading correction table based on the first lens shading correction ratio and generate a second lens shading correction table based on the second lens shading correction ratio. The controller 320 can then store the first lens shading correction table and the second lens shading correction table in the memory 350 or to an external memory. The controller 320 can also store the second lens shading correction ratio without storing it in a table in memory. A memory can be in a camera module, such as in a camera module of the second camera, can be in the controller 320, can be in the apparatus 310, can be in a camera module memory, can be in memory on a device using the multiple camera system, can be in a cloud, or can be anywhere else useful for a device using the multiple camera system. A memory can be One Time Programming (OTP) memory, can be Programmable Read-Only Memory (PROM), can be Electrically Erasable Programmable Read-Only Memory (EEPROM) memory, can be Field Programmable Read-Only Memory (FPROM) memory, can be flash memory, can be optical memory, can be a hard drive, and/or can be any other memory that can store a table.

Figure 4:
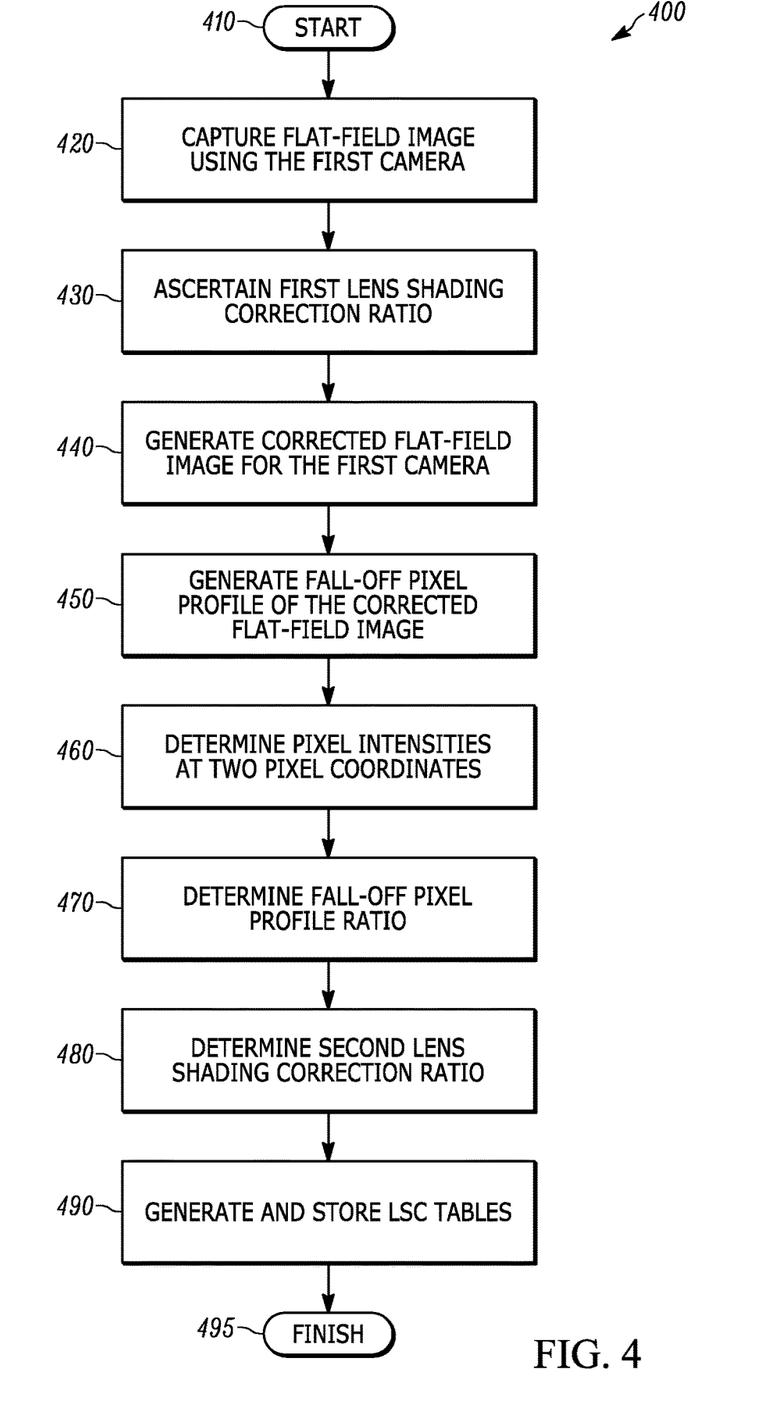
FIG. 4 is an example flowchart illustrating the operation of an apparatus according to a possible embodiment.

FIG. 4 is an example flowchart 400 illustrating the operation of an apparatus, such as the apparatus 310, according to a possible embodiment. At 410, the flowchart 400 can begin. At 420, a flat-field image can be captured using a first camera having a first lens for a multiple camera device.

Figure 5:
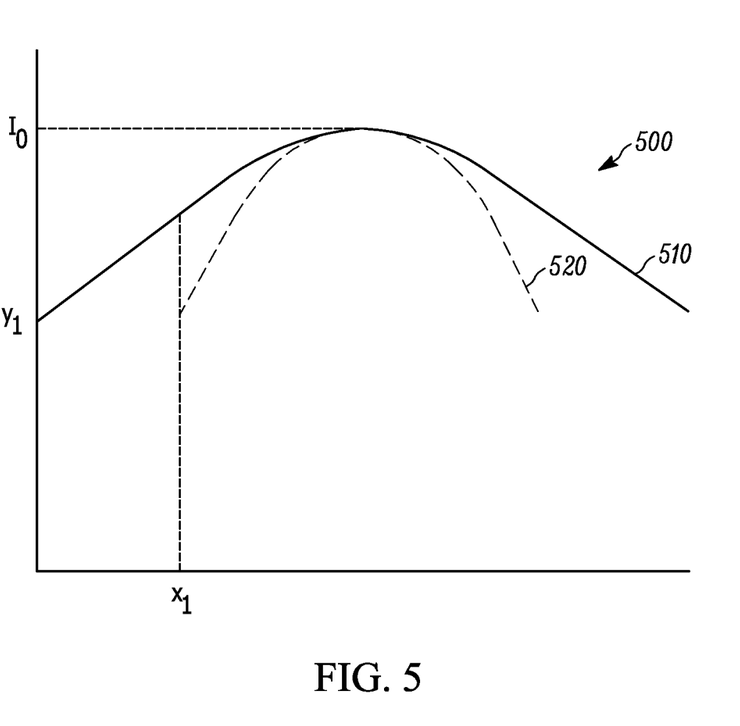
FIG. 5 is an example graph of a first camera fall-off pixel profile and a second camera fall-off profile, without any lens shading correction, when the second camera has a narrower field of view than a first camera according to a possible embodiment.

FIG. 5 is an example graph 500 of a first camera fall-off pixel profile 510 and a second camera fall-off profile 520, without any lens shading correction, when the second camera has a narrower field of view than a first camera according to a possible embodiment. For each channel per image, the image surface is from a flat-field image, and the pixel profile displayed in the graph 500 is from the diagonal cross-section of the image surface. The peak of the first fall-off pixel profile can have a pixel value of ($I_0$) and the edge of the diagonal cross-section of the image surface can have a pixel value of ($y_1$), which illustrates the effect of vignetting that creates the fall-off pixel profile. The pixel coordinate ($x_1$) can correspond to an edge of a second image to be captured by the second camera along the second camera fall-off pixel profile 520.

Figure 6:
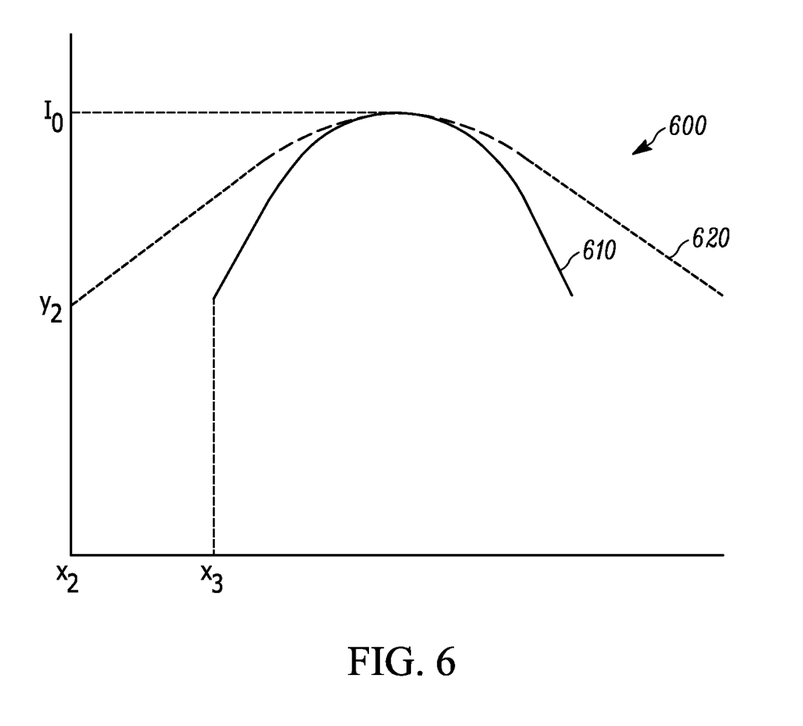
FIG. 6 is an example graph of a first camera fall-off pixel profile and a second camera fall-off profile, without any lens shading correction, when the second camera has a wider field of view than a first camera according to a possible embodiment.

FIG. 6 is an example graph of a first camera fall-off pixel profile 610 and a second camera fall-off profile 620, without any lens shading correction, when the second camera has a wider field of view than a first camera according to a possible embodiment. For each channel per image, the image surface is from a flat-field image, and the pixel profile displayed in the graph 600 is from the diagonal cross-section of the image surface. The peak of the first fall-off pixel profile can have a pixel value of ($I_0$) and the edge of the diagonal cross-section of the image surface can have a pixel value of ($y_2$), which illustrates the effect of vignetting that creates the fall-off pixel profile. The pixel coordinate ($x_2$) can correspond to an edge of a second image to be captured by the second camera along the second camera fall-off pixel profile 620 and the pixel coordinate ($x_3$) can correspond to an edge of a first image captured by the first camera along the first camera fall-off pixel profile 610.

At 430, a first lens shading correction ratio can be ascertained for the first camera. The first lens shading correction ratio can be ascertained by generating it based on design parameters, by receiving it as an input, by acquiring it from a table, by performing calculations, by performing simulations, or by any other operation for ascertaining a first lens shading correction ratio. The first lens shading correction ratio can be ascertained for the first camera to achieve an optimal trade-off between correction of vignetting of the flat-field image and reduction of corner noise of the flat-field image. For example, the first lens shading correction ratio can be chosen such that a given color channel achieves the desired lens shading correction per light source or light level of interest after lens shading correction. At 440, a corrected flat-field image of the first camera can be generated based on the first lens shading correction ratio and the flat-field image. At 450, a fall-off pixel profile of a corrected flat-field image can be generated.

At 460, a pixel intensity can be determined at two pixel coordinates. According to a possible implementation, the pixel intensity can be interpolated at a location along the fall-off pixel profile of the corrected flat-field image from the first camera. For example, a pixel intensity (y) of the fall-off pixel profile of the corrected flat-field image can be determined at the specific pixel coordinate (x) of the fall-off pixel profile of the corrected flat-field image of the first camera corresponding to a pixel coordinate of an edge of a second image to be captured by the second camera. The edge of the second image can be within an edge of the flat-field image when an area of the second image is superimposed on the corrected flat-field image of the first camera. For example, a pixel coordinate of an edge of a second image to be captured by the second camera can be a pixel coordinate of a narrower field of view of the second camera that is superimposed and centered on a field of view of the first camera. The two pixel coordinates can include the pixel intensity (y) in the form of a first pixel intensity and can include a second pixel intensity ($I_0$).

Figure 7:
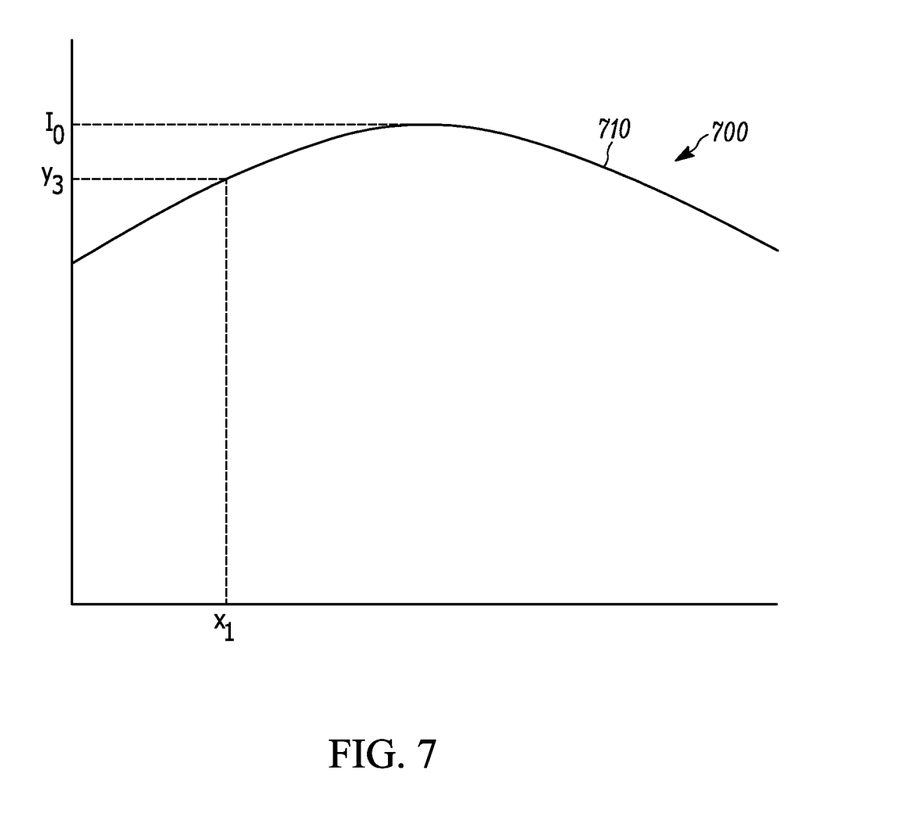
FIG. 7 is an example graph of a first camera fall-off pixel profile, generated from the first corrected flat-field image, and a second camera fall-off profile, generated from the second uncorrected flat-field image, when the second camera has a narrower field of view than a first camera according to a possible embodiment.

FIG. 7 is an example graph 700 of a first camera fall-off pixel profile of the corrected flat-filed image 710 for this implementation when the second camera has a narrower field of view than the first camera according to a possible embodiment. In this implementation, the pixel intensity ($y_3$) can be a first pixel intensity at a specific pixel coordinate ($x_1$), such as corresponding to the pixel coordinate ($x_1$) in the graph 500 for the edge of the second image to be captured by the second camera, and the fall-off pixel profile ratio can be a ratio between the first pixel intensity ($y_3$) of the fall-off pixel profile of the corrected flat-field image of the first camera, and a second pixel intensity ($I_0$) of the corrected flat-field image of the first camera at a center of the fall-off pixel profile of the corrected flat-field image of the first camera. According to this implementation, the first camera can be a camera with a first field of view and the second camera can be a camera with a narrower field of view than the first field of view. The corresponding pixel coordinate can be a respective coordinate at an edge of a narrower field of view second image to be captured from the second camera after images from the first and second cameras are merged when centered with each other. Any proper interpolation method can be used. Multiple pixel coordinates of each edge of the second image can be used and the fall-off pixel profile ratio of the multiple pixel coordinates can be averaged.

According to another possible implementation the pixel intensity (y) can be determined at a location along an extension of the fall-off pixel profile of the corrected flat-field image of the first camera at the specific pixel coordinate that corresponds to an edge of a second image to be captured by the second camera. In this implementation the pixel coordinate of an edge of a second image to be captured by the second camera can be a pixel coordinate of a field of view of the second camera that is superimposed and centered on a field of view of the first camera, where an edge of the field of view of the second camera can be outside of an edge of the field of view of the first camera.

Figure 8:
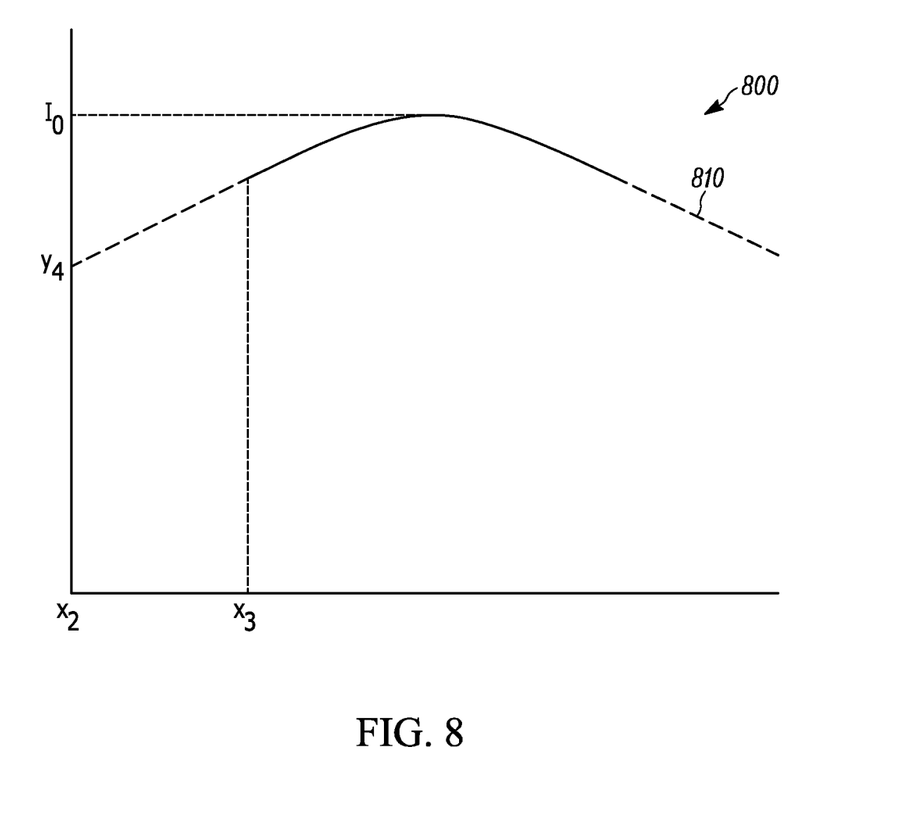
FIG. 8 is an example graph of a first camera fall-off pixel profile, generated from the first corrected flat-field image, and a second camera fall-off profile, generated from the second uncorrected flat-field image, when the second camera has a wider field of view than a first camera according to a possible embodiment.

FIG. 8 is an example graph 800 of a first camera fall-off pixel profile of the corrected flat-field image 810 for this implementation when the second camera has a wider field of view than the first camera according to a possible embodiment. The pixel intensity ($y_4$) can be a first pixel intensity and the fall-off pixel profile ratio can be a ratio between the first pixel intensity ($y_4$) of an extension specific pixel coordinate ($x_2$), such as corresponding to the pixel coordinate ($x_2$) in the graph 600 for the edge of the second image to be captured by the second camera, of the fall-off pixel profile of the corrected flat-field image of the first camera extended from the edge ($x_3$) of the first image captured by the first camera, and a second pixel intensity ($I_0$) of the corrected flat-field image of the first camera at a center of the fall-off pixel profile of the corrected flat-field image of the first camera.

According to this implementation, the first camera can be a camera with a first field of view and the second camera can be a camera with a second field of view that is wider than the first field of view. The location ($x_2$) and corresponding pixel intensity ($y_4$) along the extension of the fall-off pixel profile of the corrected flat-field image of the first camera can be extrapolated from the fall-off pixel profile of the corrected flat-field image of the first camera. Any useful extrapolation method can be used. According to a possible implementation, an iteration scheme can be used. For example, a mathematic function, such as a polynomial function, can be found to model the fall-off pixel profile or the image surface of the corrected flat-field image of the first camera, after the first lens shading correction is determined. Then, an extrapolated point at the edge of the fall-off pixel profile for a second image to be captured from the second camera can be found. For example, given the specifications of the two cameras, the pixel coordinates at the edge of second image can be located. This extrapolated point can provide a first guess of a correction ratio for second image. The flat-field image can be a first flat-field image and a second flat-field image of the second camera can be acquired with the first guess of the correction ratio. The pixel profile or image surface can be compared between the first flat-field image and the second flat-field image. If the difference of two pixel profiles or two image surfaces at a merged pixel coordinate is higher than a threshold, then the lens shading correction ratio of second image can be adjusted accordingly. Further iterations can be performed until the difference meets desired requirements.

Returning to the flowchart 400, at 470, a fall-off pixel profile ratio of the corrected flat-field image of the first camera can be determined at the specific pixel coordinate. A fall-off pixel profile can be a profile of pixel brightness falling off from the center of an image to an edge of an image, such as due to lens vignetting. For example, the fall-off pixel profile ratio of the corrected flat-field image of the first camera can be determined based on the determined pixel intensities at two pixel coordinates.

At 480, a second lens shading correction ratio can be determined for a second camera having a second lens for the multiple camera device, where the second camera can have a different field of view from the first camera, and where the second lens shading correction ratio can be based on the first lens shading correction ratio and based on the flat-field image acquired by the first camera. The second lens shading correction ratio can be based on the first lens shading correction ratio to match a second image surface of a second corrected flat-field image to a first image surface of a first corrected flat-field image. For example, the second image surface of a second corrected flat-field image using the second lens shading correction table can be matched to a first image surface of the first corrected flat-field image using the first lens shading correction table. The second lens shading correction ratio can be determined for the second camera based on the determined fall-off pixel profile ratio at the specific pixel coordinate. For example, the fall-off pixel profile ratio can be determined at the specific pixel coordinate (x) based a ratio of the first pixel intensity (y) over the second pixel intensity ($I_0$). This determined pixel profile fall-off ratio based on the first pixel intensity (y) and the second pixel intensity ($I_0$) can be the lens shading correction ratio for second image. For example, the ratio can be y/I₀*100%, which can be the lens shading correction ratio of the second image.

In the first implementation above, the correction ratio of the second image can be higher than a desired first lens shading correction ratio for the first flat-field image with a wider field of view than the second image. For example, given a camera with a narrower field of view, if the desired lens shading correction ratio can be about 80% for a camera with a wider field of view. Then the measured lens shading correction ratio for the camera with the narrower field of view can be about 85~86%.

In the second implementation above, the correction ratio of the second image can be lower than the desired correction ratio for the first flat-field image with a narrower field of view than the second image. For example, given a camera with a narrower field of view, if the desired lens shading correction ratio is about 86% for a camera with a narrower field of view, then the measured lens shading correction ratio for a camera with a wider field of view can be about 80~81%.

The multiple camera device can include more than two cameras and the lens correction ratios of each of the multiple cameras can be based on the first lens correction ratio. The method can be performed unit-by-unit or using classic calibration, where the classic method can determine lens shading correction ratios for one pair of lenses and uses the same lens shading correction ratios for each pair of lenses in production.

At 490, the first and second lens shading correction ratios or tables can be stored in memory. For example, a first lens shading correction table can be generated based on the first lens shading correction ratio and the first lens shading correction table can be stored in a memory. A second a second lens shading correction table can be generated based on the second lens shading correction ratio and the second lens shading correction table can be stored in the memory. Additionally, multiple tables can be used for multiple respective color channels. Furthermore, the steps of the flowchart 400 can be performed for multiple different light sources. For example, the multiple light sources can include a florescent light source, a tungsten light source, sunlight, and/or other light sources. Separate tables can be used to store the lens shading correction ratios or tables for the multiple light sources. At 495, the flowchart 400 can end.

The flowchart 400 can execute during tuning of lens shading correction for a multiple camera device. Then, a Look-Up-Table (LUT) can be generated for the real-time processing. It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Disclosed embodiments can provide for method and apparatus for determining lens shading correction for a multiple camera device with various fields of view. With respect to a lens shading correction ratio, light sensitivity of some lenses can decrease towards the edge of a field of view. This can be considered sensitivity fall-off. Different algorithms can use the lens shading correction ratio to correct this change in sensitivity where each pixel value can be amplified depending on the distance from the center of the image to the pixel position. The first lens shading correction ratio can be chosen for the first camera based on a desired tuning goal. Usually, the tuning goal can be to find the best balance between correction of vignetting and enhancement of corner noise. An algorithm can be used with the first lens shading correction ratio to generate a corrected flat-field image. The lens shading correction ratio can then be determined for the second camera based on the first lens shading correction ratio, such as based on the corrected flat-field image of the first camera, which is based on the algorithm that used the lens shading correction ratio to generate the corrected flat-field image.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   capturing a flat-field image using a first camera having a first lens for a multiple camera device;

ascertaining a first lens shading correction ratio for the first camera; and determining a second lens shading correction ratio for a second camera having a second lens for the multiple camera device, where the second camera has a different field of view from the first camera, and where the second lens shading correction ratio is based on the first lens shading correction ratio and based on the flat-field image acquired by the first camera, wherein the first camera has a first field of view, the second camera has a second field of view, where one of the first field of view and the second field of view is wider than the other of the first field of view and the second field of view, wherein the method further comprises:
generating a corrected flat-field image of the first camera based on the first lens shading correction ratio and the flat-field image acquired by the first camera; and
determining a fall-off pixel profile ratio of the corrected flat-field image of the first camera at a specific pixel coordinate, and wherein determining the second lens shading correction ratio comprises determining the second lens shading correction ratio for the second camera based on the determined fall-off pixel profile ratio at the specific pixel coordinate.

2. The method according to claim 1, further comprising:
generating a first lens shading correction table based on the first lens shading correction ratio;
storing the first lens shading correction table in a memory;
generating a second lens shading correction table based on the second lens shading correction ratio; and
storing the second lens shading correction table in the memory.

3. The method according to claim 1, wherein the second lens shading correction ratio is based on the first lens shading correction ratio to match a second image surface of a second corrected flat-field image to a first image surface of a first corrected flat-field image.

4. The method according to claim 1, further comprising performing the capturing, ascertaining, and determining for multiple light sources.

5. The method according to claim 1, wherein ascertaining a first lens shading correction ratio comprises ascertaining the first lens shading correction ratio for the first camera to achieve an optimal trade-off between correction of vignetting of the flat-field image and enhancement of corner noise of the flat-field image.

6. The method according to claim 1, further comprising:
determining a pixel intensity of the corrected flat-field image at the specific pixel coordinate of the fall-off pixel profile of the corrected flat-field image of the first camera corresponding to a pixel coordinate of an edge of a second image to be captured by the second camera, where the edge of the second image is within an edge of the flat-field image when an area of the second image is superimposed on the corrected flat-field image of the first camera, wherein determining the fall-off pixel profile ratio comprises determining a fall-off pixel profile ratio of the corrected flat-field image of the first camera based on the pixel intensity.

7. The method according to claim 6,
wherein the pixel intensity comprises a first pixel intensity,
wherein the fall-off pixel profile ratio is a ratio between:
the first pixel intensity of the fall-off pixel profile of the corrected flat-field image of the first camera, and
a second pixel intensity of the corrected flat-field image of the first camera at a center of the fall-off pixel profile of the corrected flat-field image of the first camera.

8. The method according to claim 1, further comprising:
determining a pixel intensity at a location along an extension of the fall-off pixel profile of the corrected flat-field image of the first camera at the specific pixel coordinate that corresponds to an edge of a second image to be captured by the second camera, wherein determining the fall-off pixel profile ratio comprises determining a fall-off pixel profile ratio of the corrected flat-field image of the first camera based on the pixel intensity.

9. The method according to claim 8,
wherein the pixel intensity comprises a first pixel intensity,
wherein the fall-off pixel profile ratio is a ratio between:
the first pixel intensity of the extension of the fall-off pixel profile of the corrected flat-field image of the first camera, and
a second pixel intensity of the corrected flat-field image of the first camera at a center of the fall-off pixel profile of the corrected flat-field image of the first camera.

10. An apparatus comprising:
an input configured to receive a flat-field image captured using a first camera having a first lens for a multiple camera device;
a controller configured to ascertain a first lens shading correction ratio for the first camera, and determine a second lens shading correction ratio for a second camera having a second lens for the multiple camera device, where the second camera has a different field of view from the first camera, and where the second lens shading correction ratio is based on the first lens shading correction ratio and based on the flat-field image acquired by the first camera; and
an output configured to output the second lens shading correction ratio, wherein the first camera has a first field of view, the second camera has a second field of view, where one of the first field of view and the second field of view is wider than the other of the first field of view and the second field of view, and wherein the controller is configured to:
generate a corrected flat-field image of the first camera based on the first lens shading correction ratio and the flat-field image acquired by the first camera,
determine a fall-off pixel profile ratio of the corrected flat-field image of the first camera at a specific pixel coordinate, and
determine the second lens shading correction ratio of for the second camera based on the determined fall-off pixel profile ratio at the specific pixel coordinate.

11. The apparatus according to claim 10,
wherein the controller is configured to generate a first lens shading correction table based on the first lens shading correction ratio and generate a second lens shading correction table based on the second lens shading correction ratio, and
wherein the apparatus further comprises a memory configured to store the first lens shading correction table and the second lens shading correction table.

12. The apparatus according to claim 10, wherein the second lens shading correction ratio is based on the first lens shading correction ratio to match a second image surface of a second corrected flat-field image to a first image surface of a first corrected flat-field image.

13. The apparatus according to claim 10, wherein the controller is configured to ascertain the first lens shading correction ratio for the first camera to achieve an optimal trade-off between correction of vignetting of the flat-field image and enhancement of corner noise of the flat-field image.

14. The apparatus according to claim 10, wherein the controller is configured to:
  determine a pixel intensity of the corrected flat-field image at the specific pixel coordinate of the fall-off pixel profile of the corrected flat-field image of the first camera corresponding to a pixel coordinate of an edge of a second image to be captured by the second camera, where the edge of the second image is within an edge of the flat-field image when an area of the second image is superimposed on the corrected flat-field image of the first camera, and
  determine the fall-off pixel profile ratio of the corrected flat-field image of the first camera based on the pixel intensity.

15. The apparatus according to claim 14,
  wherein the pixel intensity comprises a first pixel intensity,
  wherein the fall-off pixel profile ratio is a ratio between:
    the first pixel intensity of the fall-off pixel profile of the corrected flat-field image of the first camera, and
    a second pixel intensity of the corrected flat-field image of the first camera at a center of the fall-off pixel profile of the corrected flat-field image of the first camera.

16. The apparatus according to claim 10, wherein the controller is configured to:
  determine a pixel intensity at a location along an extension of the fall-off pixel profile of the corrected flat-field image of the first camera at the specific pixel coordinate that corresponds to an edge of a second image to be captured by the second camera, and
  determine the fall-off pixel profile ratio of the corrected flat-field image of the first camera based on the pixel intensity.

17. The apparatus according to claim 16,
  wherein the pixel intensity comprises a first pixel intensity,
  wherein the fall-off pixel profile ratio is a ratio between:
    the first pixel intensity of the extension of the fall-off pixel profile of the corrected flat-field image of the first camera, and
    a second pixel intensity of the corrected flat-field image of the first camera at a center of the fall-off pixel profile of the corrected flat-field image of the first camera.

18. An apparatus comprising:
  a first camera having a first lens, the first camera configured to capture a first image;
  a second camera having a second lens, the second camera having a different field of view from the first camera, the second camera configured to capture a second image;
  a memory including
    a first lens shading correction ratio correction table based on a first lens shading correction ratio of the first camera, and
    a second lens shading correction ratio correction table based on a second lens shading correction ratio, where the second lens shading correction ratio is based on the first lens shading correction ratio and based on a flat-field image captured using the first camera; and
  a controller configured to provide lens shading correction to the first image based on the first lens shading correction table to generate a corrected first image, provide lens shading correction to the second image based on the second lens shading correction table to generate a corrected second image, and merge the corrected first image with the corrected second image to generate a merged image,
  wherein the first camera has a first field of view, the second camera has a second field of view, where one of the first field of view and the second field of view is wider than the other of the first field of view and the second field of view,
    wherein the second lens shading correction ratio is based on a determined fall-off pixel profile ratio at a specific pixel coordinate,
    wherein the fall-off pixel profile ratio is determined based on a corrected flat-field image of the first camera, and
    wherein the corrected flat-field image of the first camera is generated based on the first lens shading correction ratio and the flat-field image captured using the first camera.

* * * * *